United States Patent [19]
King

[11] Patent Number: 5,691,640
[45] Date of Patent: Nov. 25, 1997

[54] FORCED BALANCE METAL DETECTOR

[75] Inventor: Kevin James King, Golden Valley, Minn.

[73] Assignee: Ramsey Technology, Inc., Coon Rapids, Minn.

[21] Appl. No.: 559,988

[22] Filed: Nov. 17, 1995

[51] Int. Cl.$^6$ .......................... G01R 33/12; G01N 27/72; G01V 3/10

[52] U.S. Cl. .......................... 324/233; 324/225; 324/239; 324/241

[58] Field of Search .......................... 324/225, 232, 324/233, 239–243, 329, 334; 361/180; 209/546, 549, 567; 340/551, 941

[56] References Cited

U.S. PATENT DOCUMENTS

| | | |
|---|---|---|
| 3,614,600 | 10/1971 | Ronka .................... 324/334 X |
| 4,006,407 | 2/1977 | Flaherty .................... 324/233 |
| 4,207,520 | 6/1980 | Flora et al. .................... 324/233 X |
| 4,283,680 | 8/1981 | Kerr .................... 324/234 |
| 4,300,097 | 11/1981 | Turner .................... 324/233 X |
| 4,563,645 | 1/1986 | Kerr .................... 324/233 |
| 4,719,421 | 1/1988 | Kerr .................... 324/233 |
| 4,727,330 | 2/1988 | Funk .................... 324/233 X |
| 5,034,689 | 7/1991 | Inoue et al. .................... 324/225 |
| 5,045,789 | 9/1991 | Inoue et al. .................... 324/225 |
| 5,189,366 | 2/1993 | Mayo .................... 324/233 |

FOREIGN PATENT DOCUMENTS 2230611 10/1990 United Kingdom.

Primary Examiner—Gerard R. Strecker
Attorney, Agent, or Firm—David George Johnson

[57] ABSTRACT

Metal detector (1) including an oscillator (10) generates an RF field in the vicinity of the head (2). Two reference signals (13, 14) are generated, one signal (14) being in phase with the oscillator (10) and the other signal (13) being shifted from the oscillator signal by 90°. The signal (8,9) from the receive coils (6,7) is amplified and quadrature demodulated into two signal channels, each channel giving the orthogonal component of the original signal (8,9). The signals of each channel are digitized and read by a microprocessor (37) that controls the amplitude of the balance signals (43, 49). One signal (43) is in phase with the oscillator signal (11) and the second signal (49) is shifted 90° from the oscillator signal (11). Signals (43,49) return to detection circuitry (6,7), maintaining balance on each channel. By monitoring the magnitude of the phase shifted and unshifted signals (49,43), the microprocessor (37) determines the characteristics of the product. In a second version, metal detector (62) includes a digital phase shifting circuit (77) but only one phase sensitive detector (84). The circuit (77) is manipulated by microprocessor (89) to maximize RF signal (87). The balance circuits (92, 100) remove signal (87). By monitoring the control signals (79) used for balancing, the microprocessor (89) determines characteristics of a product passing in the vicinity of the head assembly (63).

19 Claims, 2 Drawing Sheets

FORCED BALANCE METAL DETECTOR

BACKGROUND OF THE INVENTION

1. Field of the Invention

The present invention relates generally to the field of materials monitoring, and more specifically to a phase sensitive device for detecting changes in food that may be indicative of an alteration in materials, product formula or spoilage, these changes being sensed as the product travels on a conveyor that passes through or near the phase and amplitude sensitive device.

2. Discussion of Related Technology

Present metal detector systems typically utilize phase sensitive detection principles. The detection circuits may be of the analog type with a minimum of digital logic or may be highly digital, using microprocessors and microcontrollers with a minimum of analog circuitry. Head balance is maintained through separate circuitry from the signal circuitry, resulting in unwanted and uncontrolled interaction between the head balancing signal and signal from product or metal passing through the head. Another method of balancing is to leave the head balancing signal unchanged unless the needed balance correction is past some certain level. No interaction of the balancing and detection circuitry occurs until the signal is past this level. Rebalancing then occurs, during which time the metal signal detection circuitry is inactive. Thus, the typical prior art metal detector includes two separate hardware or software circuits or systems.

The first circuit is used to maintain balance of the detector head, and is required in order to compensate for asymmetries in the head assembly. Compensation is also required to account for slowly changing conditions in the region surrounding the head assembly. Such conditions might include residual variations in the electomagnetic path of the oscillator field typically caused by thermal changes to the detector head, changes in the conveyor or mounting structure or the location of nearby equipment. This first balancing circuit is typically designed to have a relatively slow time constant because changes in the head balance occur slowly and continuously rather than as small instantaneous changes or variations.

The second circuit is dedicated to the actual detection of the presence of metal in the region of the head. This detection is typically accomplished by having the detection circuit establish a threshold or "background" level, and any signal exceeding this threshold level is assumed to indicate the presence of metal in the region surrounding the head. Additionally, some effort is usually made to cancel or phase out the effect of the nonmetallic product as it passes by the detection head. Unfortunately, the detection signal produced from the product or from the product with metal must necessarily interact with the first, already existing signal which is maintaining head balance in the absence of either the product being tested or any metal objects. For example, if a very small change in the balance maintaining signal occurs at too rapid a rate it will create a signal in the detection circuitry which may be large. As a result of this large signal, the metal detecting circuit will falsely indicate the detection of metal. Further, the balancing circuit is always attempting to maintain head balance, even if the imbalance is caused by the presence of the product under test. This effect is particularly noticeable when the product is entering and exiting the region of the head because the balance circuit incorrectly attempts to balance out the effect of the product and thereby creates an actual imbalance in the head, resulting in transient signals as the product passes through the head.

Numerous prior art metal detectors exist. For example, U.S. Pat. No. 4,283,680 discloses a detector which senses the presence of metal by monitoring the rate at which the unbalanced voltage produced by the bridge circuit varies. If the voltage varies rapidly, the imbalance is assumed to be due to the presence of metal rather than mere thermal drift or other environmental factors. The rate is sensed by presenting the unbalanced signal to an R-C network (R6 and C2 in FIG. 1). If the rate of change is small, the network appears as a short circuit, causing the input to the alarm circuit to remain "low" or deactivated. If the rate of change is great and the magnitude of the voltage exceeds a certain reference value, the R-C network presents a substantial impedance, permitting the signal to reach the input of the alarm circuit and activate the alarm.

A related patent is U.S. Pat. No. 4,563,645, which also involves the manipulation of an R-C time constant. In the '645 patent, the automatic balancing circuitry is-rendered inoperative when metal is detected, but is rapidly restored to its previously existing feedback values after metal has been sensed and allowed to exit the region of the sensing heads. This fast return to its previously balanced state is accomplished by switching between circuits having two different time constants. U.S. Pat. No. 4,719,421 discloses the use of an adjustable phase shifter (element 10 in FIG. 2). The phase shifter is adjusted to provide a null or linear output in response to product variations that might otherwise erroneously indicate the presence of metal. More specifically, if a nonlinear output is produced more than a given number of times in succession, thereby indicating that the nonlinearity is characteristic of that particular product, then the phase shifter is adjusted to produce a linear output.

A metal detector utilizing digital signal processing is disclosed in U.S. Pat. No. 5,043,689. The '689 patent depicts a digital signal detection and processing scheme for processing the analog data produced by a metal detector. The disclosure includes a lengthy and detailed program including specific algorithms by which the required data manipulations are accomplished. A related patent is U.S. Pat. No. 5,045,789, which discloses the concept of defining a set of parameters or values which define the envelope, and thus the border between an acceptable product and one containing metal.

Finally, British Patent No. 2,230,611 discloses a metal detector which updates or modifies stored reference values based on measured phase differences "if the detected phase difference is about equal to the acceptable phase difference".

All of the discussed references are therefore attempting to deal with the problem of interaction between the head balancing signal and the metal detection signal which is sometimes present during operation of the metal detector.

SUMMARY OF THE INVENTION

The present invention is a metal detector utilizing phase sensitive detection principles to constantly maintain balance of the detector head while simultaneously using the head balancing signals for analysis of the product passing by or through the detector head. Because the same signals perform both the balancing and detection functions, there can be no interaction between separate balancing and detection circuits and thus the complications caused by such interaction and the attempts to compensate for such interaction are avoided.

The metal detector of the present invention utilizes a microprocessor to maintain electrical balance of the detector head assembly. When an imbalance occurs, whether it is caused by head drift or by product passing through the head, the microprocessor must generate a signal to reestablish and maintain head balance. The magnitude, phase and frequency of the signal generated in response to head imbalance can be analyzed. This analysis of the signal determines if the original unbalanced condition was caused by head drift or by product passing through the detector, and in addition, the properties of the product can be determined to indicate if the product contained metal or some other foreign substance.

In an alternate embodiment, a digital phase shifting circuit is used to create one of two signals used to maintain head balance. By monitoring the manipulations of the digital phase shifter required to achieve head balance, the characteristics of the product passing through the sensing head assembly may be determined.

DETAILED DESCRIPTION OF THE PREFERRED EMBODIMENT

Figure 1:
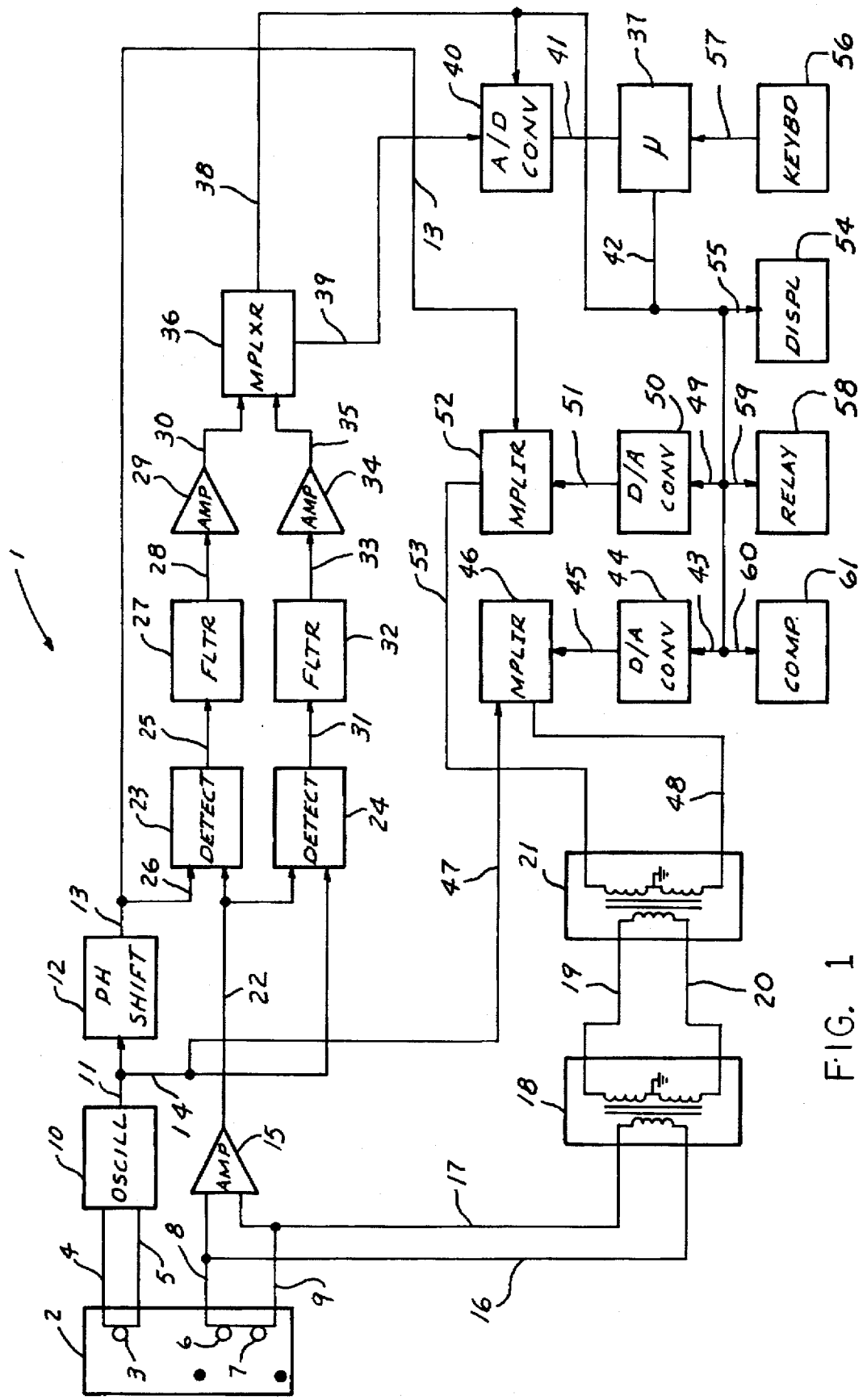
FIG. 1 is a block diagram of a metal detector constructed according to the principles of the present invention.

As seen in FIG. 1, the metal detector 1 includes a search head assembly 2. Within the search head 2 is an oscillator exciter coil 3 which generates a radio frequency field that is radiated throughout the region immediately adjacent to the coil 3. Included within the head assembly 2 and within the region affected by the field generated by exciter coil 3 is a first detector or receiver coil 6 and a second detector or receiver coil 7. When actually constructed as a hardware configuration, the oscillator coil 3 resides between the first detector coil 6 and the second detector coil 7. The receiver coils 6 and 7 are interconnected so as to be in series opposition. The resultant output of receiver coils 6 and 7 is propagated along signal paths 8 and 9. The series interconnection of coils 6 and 7 is desired so as to cancel the induced currents from the exciter coil 3. Thus, the net output or difference of potential between signal paths 8 and 9 is approximately zero when no foreign material is within the aperture of head assembly 2.

The oscillator coil 3 is excited by oscillator circuit 10, which generates a radio frequency signal that travels to coil 3 along signal paths 4 and 5. Typically, the frequency of the output signal from oscillator 10 has a value of between 50 kiloHertz and 1.0 MegaHertz. The oscillator circuit 10 also has a second output signal path 11 which travels to a phase shifting circuit 12. The output signal leaving the phase shifting circuit 12 along signal path 13 is of the same frequency as the input signal 11, but lags or trails the phase of input signal 11 by approximately 90°. One of ordinary skill in the art will appreciate that the phase shift does not have to be ninety degrees. Both signals 11 and 13 could be shifted to any desired extent as long as the phase difference between the two signal channels is known. In the preferred embodiment, the original, unshifted signal 11 is also available along signal path 14, to be used in the circuitry of metal detector 1 as will be described later.

The receiver coils 6 and 7 are interconnected along signal paths 8 and 9 to an amplifier 15. The signal paths 8 and 9 are also interconnected to signal paths 16 and 17, respectively.

The latter two signal paths 16 and 17 serve as the interconnection to a feedback isolation transformer 18. If additional isolation is needed in a particular application, the input of transformer 18 at signal paths 19 and 20 can be fed from the output of a second isolation transformer 21. In most cases, transformer 21 is redundant with transformer 18 providing adequate isolation. Isolation can also be accomplished utilizing other methods (not shown) such as optical isolation or capacitive coupling. In other cases, the particular circuit board layout may not require any isolation of signal paths 16 and 17 from subsequent components, and so the transformers 18 and 21 would be unneccessary. The feedback path 19 and 20 is used to transmit signals to maintain a balanced condition at the receiver coils 6 and 7, as will be discussed later in more detail. The feedback signal 19 and 20 used to cancel any out of balance signal may also be placed on signal path 22, after the first stage of amplification 15. The output of receiver coil amplifier 15 travels along signal path 22 and serves as the input to both a first phase sensitive detector 23 and a second phase sensitive detector 24. The first phase detector also includes as a reference signal a second input signal 26, the 90° phase shifted output signal 13 which is generated by the phase shifting circuit 12. The analog output signal 25 of phase detector 23 is proportional to the difference between the phase of signals 26 and 22 multiplied by the amplitude of the signal on signal path 22, and is minimum when the signals 26 and 22 are 90° out of phase. The output signal 25 is at a maximum when the respective phases of signals 26 and 22 are substantially identical. The output signal 25 is fed to a low pass filter 27, which removes the radio frequency component of the input signal 25 and leaves only the low frequency components of the analog signal generated by the phase detector 23. The analog signal generated by phase detector 23 appears as the output signal 28 leaving low pass filter 27. The output signal 28 is fed to an amplifier 29 which produces an amplified output signal 30.

The second phase detector 24 includes as a second input signal 14, which is the original, unshifted reference signal 11 produced by the oscillator 10. The phase detector generates an analog output signal 31 which is proportional to the difference in phase between input signals 22 and 14 multiplied by the amplitude of the signal on signal path 14, the minimum signal occurring when the phases of signals 22 and 14 are offset from each other by 90°. The output signal 31 is at a maximum when the respective phases of signals 22 and 14 are substantially identical. The output signal 31 is fed to a low pass filter 32 so as to remove the radio frequency component of signal 31 and leaves only the low frequency components of the analog signal 31 generated by the phase detector 24. The low pass filter 32 thus creates an output signal 33 which is the same as the analog signal generated by phase detector 24 and which is subsequently fed to an amplifier 34. The amplifier 34 generates an amplified low frequency output signal 35.

Each of the output signals 30 and 35 is fed as one of the two inputs to multiplexer 36. The multiplexer alternately selects one of the signals 30 or 35 according to instructions received from microprocessor 37 along signal path 38. The instantaneous output signal 39 emanating from multiplexer 36 is thus either the input signal 30 or the input signal 35. The chosen output signal 39 is sent to an analog to digital converter 40, where the low frequency analog signal 30 or 35 is transformed into an equivalent digital signal that is suitable for processing by the microprocessor 37. The digital output signal of analog to digital converter 40 is sent to microprocessor 37 along signal path 41.

The microprocessor 37 digitally processes the signals 41 according to feedback algorithms that are well known in the art. Algorithms that could be advantageously used in this manner include P (Proportional), PI (Proportional/Integral), PID (Proportional, Integral, Derivative), PEIC (Periodic Error Integrating Control) and Fuzzy Logic Based methods such as the Widrow Hoff Least Means Squared algorithm. The microprocessor 37 then determines the amount of signal that is required to achieve and maintain a balanced, zero difference of potential condition at the outputs 8 and 9 of the receiver coils 6 and 7. As can be readily appreciated by those of ordinary skill in the signal processing art, a signal such as the primary input signal on paths 8 and 9 has a fixed frequency. A signal such as that appearing on paths 8 and 9, regardless of its phase and magnitude can therefore by created by summing two other signals of the same frequency but of different phases and amplitudes. The phase and amplitude of each of the two signals must have the proper relationship to recreate the signal on paths 8 and 9, and as a feedback or balancing signal will have the opposite polarity and same magnitude of the original signal on paths 8 and 9. The feedback signal is fed through isolation transformer 21 along signal paths 16 and 17 to outputs 8 and 9 of the receiver coils 6 and 7 as will now be discussed in greater detail.

Referring now to the reference, unshifted signal path of which phase detector 24 is one component, the output signal 35 is alternatively fed along signal path 39 and processed by microprocessor 37. In essence, each of the individual channels defined by signal paths 30 and 35 reads or detects the component of the signal 22 having a particular phase characteristic. The signal level measured on the unshifted channel or path 35, for example, is an indicator of how much unshifted signal 14 must be fed back in the opposite polarity to the input path 16 and 17 to cancel the unshifted component. This of course does not include radio frequency gain or amplification introduced by the digital to analog conversion process, which can be treated as a constant. One signal on the microprocessor data bus 42 including the processed signal 35 is transmitted along data path 43, where it serves as the input to a digital to analog converter 44. The converter 44 generates an analog feedback signal 45 which is input to an analog multiplier 46. Also input to the multiplier 46 is the unshifted oscillator reference signal 11, which travels along signal paths 11 and 14 before reaching multiplier input signal path 47. The reference signal 11 is of constant amplitude and fixed phase. The other input signal 45 amplitude modulates the reference signal 11. The modulated signal 47 appears as the output signal 48 which is fed to the feedback isolation transformer 21.

During the other portion of the multiplexing cycle, the phase shifted signal 30 is selected by multiplexer 36 and sent to microprocessor 37. The signal 30 is, as previously discussed, an indicator of how much of the phase shifted signal 13 must be fed back along signal paths 16 and 17 in order to cancel the shifted component of signal 11 appearing at heads 6 and 7. The microprocessor output signal 42 represents the processed signal 30 which is fed along data line 49 and serves as the input to a second, separate digital to analog converter 50. The analog output signal 51 serves as one input to an analog multiplier 52, which has as its second input signal the phase shifted output signal 13 of the phase shifting circuit 12. The multiplier 52 amplitude modulates the phase shifted signal 13 with the analog signal 51, creating an output signal 53 which is an input to the feedback isolation transformer 21. The phase shifted output signal 53 thus eventually reaches the receiver coils 6 and 7 in a magnitude that tends to establish and maintain a null output condition across signal paths 8 and 9.

The metal detector 2 also includes a display 54, such as a liquid crystal display, which can receive inputs along signal path 55 from microprocessor 37, thereby indicating any of a variety of parameters regarding signal magnitude and phase relationships which would be indicative of the type of materials passing through the region adjacent to head assembly 2. The display 54 is also for viewing various other parameters necessary for operating a metal detection system 1. These parameters include selecting reject devices, delays and durations, speeds, initiating a "Learn" program and other similar operations well known to those skilled in the metal detection art.

A keyboard 56 is also interconnected to microprocessor 37 along signal path 57 to permit entry of system parameters. In the event that a product is sensed that should be rejected, the microprocessor 37 can be programmed to trigger an alarm or other appropriate relay 58 along signal path 59. Additionally, the microprocessor can digitally communicate via signal path 60 with a remote terminal, display or computer 61.

Initially, the system 1 is put into a "Learn" mode, whereby the keyboard 56 is used to enter the desired or proper parameters which would be appropriate for a particular type of food product or other material under test. In operation, an item which is desired to be free of metal, such as a food item, is passed along a conveying system (not shown) so as to pass in the vicinity of the sensing head assembly 2. Prior to the arrival of the product, the receiver coils 6 and 7 are receiving fields of equal magnitude but opposite polarity, thereby resulting in a balanced condition, that is, no difference of potential across signal paths 8 and 9. Due to the presence of the product passing through the radio frequency field generated by exciter coil 3, the symmetry of the perfectly cancelling fields surrounding detector coils 6 and 7 is disturbed. The microprocessor 37 becomes aware of this asymmetry by monitoring variations in the output signal 39 of multiplexor 36, and generates appropriate corrective signals 43 and 49 in order to maintain electrical head balance. The microprocessor also generates and stores data reflecting the characteristics of the corrective signals 43 and 49 being generated to maintain head balance. Each combination of signals 43 and 49 will represent a distinctive signature of the product being sensed, and the microprocessor software is programmed to trigger the alarm 58 or generate a display on LCD 59 in response to the particular signature or signal combination being observed. In this manner, the properties of the metal or product being sensed can be determined solely by analyzing the characteristics of signals 43 and 49 which are required to maintain electrical balance of head assembly 2.

Figure 2:
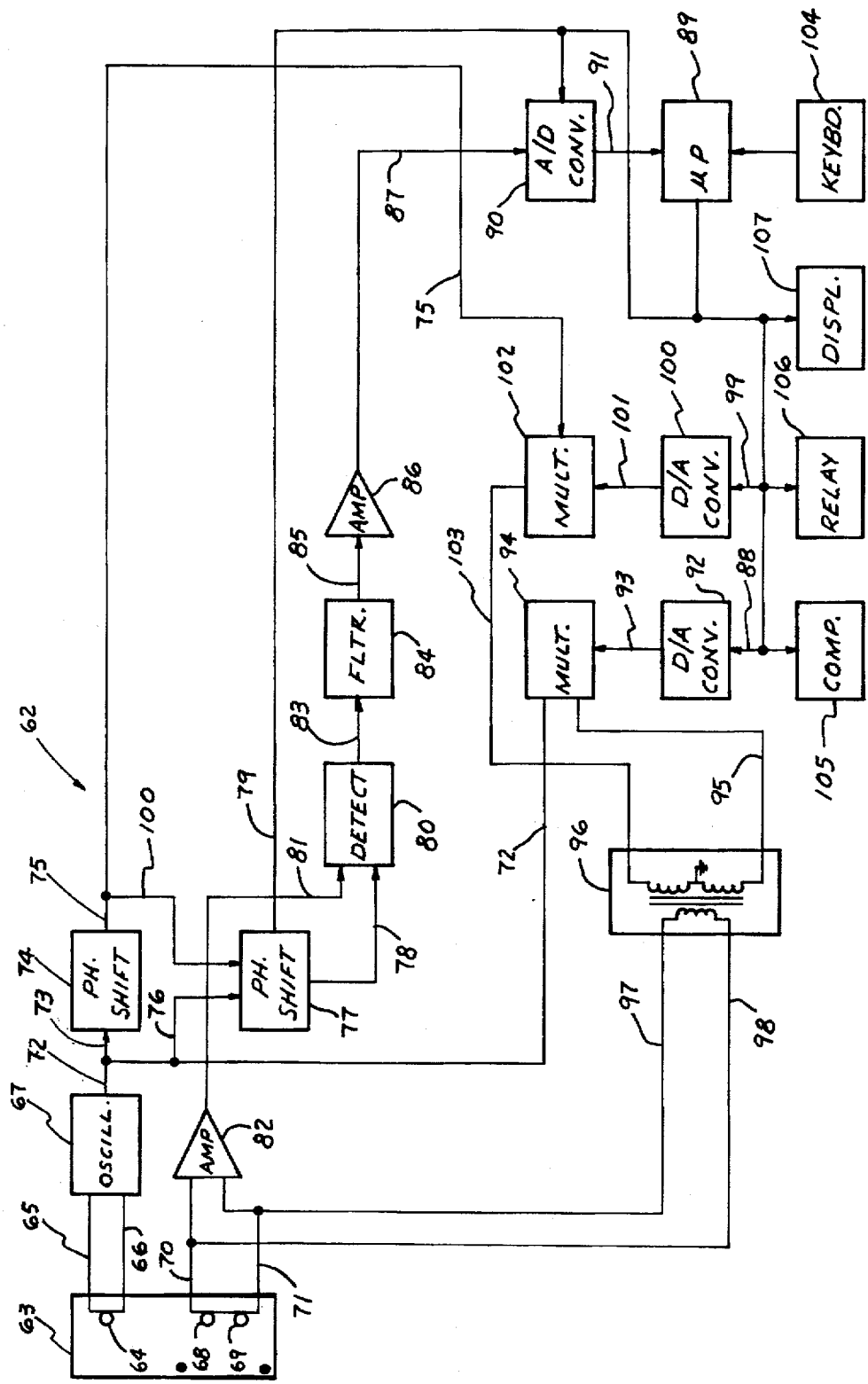
FIG. 2 is a block diagram of an alternate embodiment of a metal detector constructed according to the principles of the present invention.

Referring now to FIG. 2, an alternate embodiment of the present invention can be understood. The metal detector 62 includes a sensing head 63 having an exciter coil 64 which generates a radio frequency field derived from signal paths 65 and 66. The signal paths 65 and 66 are connected to an oscillator 67 operating at a frequency of between 50 kilohertz and 1.0 MegaHertz. Surrounding the oscillator coil 64 is a first detector coil 68 and a second detector coil 69 which are wired in series opposition such that there is no nominal difference of potential across signal paths 70 and 71.

The oscillator 67 also outputs a signal along signal path 72, which serves as the input signal 73 to a phase shifting circuit 74. The output signal 75 emanating from circuit 74 is trailing or lagging by approximately 90° the input signal 73.

The unshifted oscillator output signal 72 and the 90° shifted output signal 75 also serve as the input signals 76 and 108, respectively, to a digital phase shifting circuit 77. The digital phase shifting circuit 77 creates an output signal 78 that varies between a 0° and a 360° phase shift with respect to the input signal 76. The amount of the phase shift present in signal 78 is dependent on a control signal 79 received from microprocessor 89.

The output signal 78 from the digital phase shifter 77 serves as one input to a phase sensitive detector 80. The other input signal 81 to phase sensitive detector 80 is derived from the output of radio frequency amplifier 82, which amplifies any RF signal appearing as the output of detector coils 68 and 69. Thus, the output signal 83 coming from phase sensitive detector 80 is representative of the difference in phase between its two input signals 78 and 81. The output signal 83 is sent through low pass filter 84 and the resultant signal 85 is amplified by amplifier 86. The output of amplifier 86 serves as the input signal 87 to an analog to digital converter 90, which feeds its output signal 91 to microprocessor 89. In this manner, the microprocessor 89 can monitor the effect of its own output signal 79 to the phase shifter 77 on the output 78 of phase shifter 77 as sensed through signal 91. Further, the microprocessor 89 provides an input signal 88 to a first digital to analog converter 92 which produces an analog output signal 93. The analog signal 93 feeds an analog multiplier 94 which amplitude modulates the unshifted oscillator output signal 72 and creates a first head balancing signal 95. The balancing signal 95 is sent through isolation feedback transformer 96, which has output leads 97 and 98 connected to the output leads of receiver coils 68 and 69.

Microprocessor 89 also generates output signal 99 that is fed to digital to analog converter 100. The analog output signal 101 is sent to a second analog multiplier 102 where the 90° shifted signal 75 is amplitude modulated to produce a second head balancing signal 103. The balancing signal 103 is fed to isolation feedback transformer 96 and thence to receiver coils 68 and 69.

As in the embodiment depicted in FIG. 1, a variety of inputs such as keyboard 104 or digital communication port 105 provide data or program access to microprocessor 89. Similarly, the microprocessor 89 can trigger alarms 106 and generate displays on cathode ray tube 107. In operation, the microprocessor 89 monitors the condition of balance in detector coils 68 and 69 by observing the signal 91, and seeks to achieve balance of the receiver heads by generating feedback signals 88 and 99. In particular, the phase of the digital phase shifter 77 is selected to maximize the received signal 91, that is, the phase shifter 77 is adjusted so that the reference signal 78 is in phase with the radio frequency input signal on path 81. The balance circuitry 92, 94, 100 and 102 is adjusted to eliminate the signal on paths 70 and 71. The digital signals 88 and 99 sent to the digital to analog converters 92 and 100 to maintain coils 68 and 69 in balance are analyzed by microprocessor 89 to determine if the signal on paths 97 and 98 is different than expected for the product or being examined.

The signal 79 generated by the microprocessor 89 controls the digital phase shifter 77 and indirectly controls the resultant signal 91. By observing the manipulations of signal 79 required to achieve and maintain head balance, the microprocessor can display characteristics of the product passing in the region of the head assembly 63.

As various changes could be made in the above constructions without departing from the scope of the invention, it is intended that all matter contained in the above description or shown in the accompanying drawings shall be interpreted as illustrative and not in a limiting sense.

I claim:
1. A metal detector, comprising:
    (a) an electromagnetic field generator, the generator generating a radio frequency signal having a first phase characteristic;
    (b) an electromagnetic field sensor, the electromagnetic field sensor producing an output signal, the electromagnetic field sensor detecting:
        (i) the first phase characteristic of the radio frequency signal produced by the electromagnetic field generator;
        (ii) an amplitude of the radio frequency signal;
        (iii) a frequency of the radio frequency signal; and
        (iv) variations in the first phase characteristic, amplitude and frequency caused by foreign objects entering an electromagnetic field adjacent to the electromagnetic field sensor;
    (c) a feedback circuit, the feedback circuit being interconnected to and receiving the output signal of the electomagnetic field sensor, the feedback circuit comprising:
        (i) an electrical interconnection to a first signal, the first signal being substantially identical to the radio frequency signal produced by the electromagnetic field generator;
        (ii) an electrical interconnection to a second signal, the second signal being a composite of the first signal and a phase shifted component of the first signal; and
        (iii) an electrical interconnection of the first signal and the phase shifted component of the first signal to the electromagnetic field sensor;
    (d) a microprocessor, the microprocessor comprising:
        (i) at least one input data port, the input data port being interconnected to the first signal and the phase shifted component of the first signal emanating from the feedback circuit; and
        (ii) at least one data output port; and
    (e) a first multiplier, the first multiplier being interconnected to:
        (i) the data output port;
        (ii) the first signal; and
        (iii) the feedback circuit, the first multiplier modulating the first signal with a signal appearing at the data output port to produce a modulated signal which is thereby interconnected to the feedback circuit; and
    (f) a second multiplier, the second multiplier being interconnected to:
        (i) the data output port;
        (ii) the phase shifted component of the first signal; and
        (iii) the feedback circuit, the second multiplier modulating the phase shifted component of the first signal appearing at the data port to produce a modulated signal which is thereby interconnected to the feedback cirsuit, the microprocessor alternatively selecting the first signal and the phase shifted component of the first signal to appear at the data output port so as to maintain an electrically balanced condition in the electromagnetic field sensor, the microprocessor monitoring the manipulations so as to determine:
            (A) signal manipulations attributable to maintaining field sensor balance in the absence of a product passing through a region near the field sensor; and
            (B) signal manipulations attributable to maintaining field sensor balance in the presence of a product passing through a region near the electromagnetic field sensor.

2. The metal detector of claim 1, wherein the electromagnetic field generator comprises:
   (a) an oscillator, the oscillator operating at a first frequency; and
   (b) a coil, the coil being electrically interconnected to the oscillator so as to radiate an electromagnetic field at the first frequency and having the first phase characteristic.

3. The metal detector of claim 2, wherein the electromagnetic field sensor comprises;
   (a) a first coil; and
   (b) a second coil, the first and second coils being physically arranged so as to be substantially electrically symmetrical with respect to the electromagnetic field generator coil.

4. The metal detector of claim 3, wherein the feedback circuit comprises:
   (a) a first signal processing channel, the first signal processing channel being adapted to receive the first signal, the first signal having a phase that is substantially identical to the electromagnetic field generator signal; and
   (b) a second signal processing channel, the second signal processing channel being adapted to receive the second signal, the second signal being a composite of the first signal and a phase shifted component of the the first signal.

5. The metal detector of claim 4, wherein the microprocessor selectively feeds back signals emanating from the first signal processing channel and the second signal processing channel to the electromagnetic field sensor so as to maintain electrical balance of the electromagnetic field sensor.

6. The metal detector of claim 5, wherein the microprocessor:
   (a) stores a first set of data pertaining to signals fed back from the first signal processing channel to the electromagnetic field sensor;
   (b) stores a second set of data pertaining to signals fed back from the second signal processing channel to the electromagnetic field sensor; and
   (c) processes the first and second sets of data so as to identify characteristics of products in the region of the electromagnetic field sensor.

7. The metal detector of claim 6, wherein the first signal processing channel further comprises a first phase sensitive detector, the first phase sensitive detector being adapted to receive:
   (a) a first signal having phase characteristics substantially identical to the electromagnetic field generator signal; and
   (b) a second signal having phase characteristics substantially identical to a signal emanating from the electromagnetic field sensor;
the first phase sensitive detector thereby producing a first output signal that is representative of the amplitude of the second signal with the phase characteristic of the first signal.

8. The metal detector of claim 7, wherein the second signal processing channel comprises a second phase sensitive detector, the second phase sensitive detector being adapted to receive:
   (a) a first reference signal having phase characteristics such that the phase of the first reference signal lags the phase of the electromagnetic field generator signal; and
   (b) the second signal emanating from the electromagnetic field sensor; the second phase sensitive detector thereby producing a second output signal that is representative of the amplitude of the second signal with the phase characteristics of the first signal.

9. The metal detector of claim 8, wherein the first reference signal lags the phase of the electromagnetic field generator signal by approximately ninety degrees.

10. The metal detector of claim 9, wherein the first output signal and the second output signal are both electrically interconnected to inputs of a multiplexer, the multiplexer having a single output that is selected by the microprocessor.

11. A foreign object detector for determining the characteristics of a product in the vicinity of a sensing head, comprising:
   (a) a radio frequency oscillator, the radio frequency oscillator having a frequency and a phase;
   (b) an exciter coil electrically interconnected to the oscillator;
   (c) an electromagnetic field detector, the electromagnetic field detector sensing a signal emanating from the exciter coil;
   (d) a feedback circuit, the feedback circuit comprising:
      (i) a phase sensitive detector having two input signals, the two input signals being:
         A. a signal that is derived from a phase difference between the radio frequency oscillator signal; and
         B. a phase shifted component of the signal emanating from the radio frequency oscillator; and
      (ii) an electrical interconnection to the electromagnetic field detector by a controller, the controller receiving an input signal derived from the phase sensitive detector, the input signal being proportional to a phase difference between the two input signals to the phase sensitive detector, the controller:
         A. selectively enabling the feedback circuit to send field detector balancing signals derived from the radio frequency oscillator and the electromagnetic field detector to the electromagnetic field detector so as to maintain electrical balance of the electromagnetic field detector;
         B. storing information regarding balancing signals sent to the electromagnetic field detector; and
         C. categorizing balancing signal manipulations sent to the electromagnetic field detector so as to determine a characteristic of a foreign object.

12. The foreign object detector of claim 11, further comprising:
   (a) a variable phase shifting circuit, the variable phase shifting circuit comprising:
      (i) a first input signal, the first input signal being an output signal of the radio frequency oscillator;
      (ii) a second input signal, the second input signal being a phase shifted signal derived from the output signal of the radio frequency oscillator; and
      (iii) a third input signal, the third input signal being received from the controller so as to determine a degree of desired phase shift of the variable phase shifting circuit, the variable phase shifting circuit being electrically interconnected to the phase sensitive detector and sending an output signal thereto, the output signal having a phase an amplitude; and
   (b) a microprocessor, the microprocessor being electrically interconnected to the variable phase shifting circuit, the microprocessor adjusting the phase of the output signal of the variable phase shifting circuit so as to maintain a maximum signal from the electromagnetic field detector, phase and amplitude information from the signal being utilized to adjust balance circuitry to minimize the amplitude of the signal.

13. The foreign object detector of claim 12, wherein the microprocessor stores a set of data pertaining to adjustments made to the variable phase shifting circuit to maintain electrical balance of the electromagnetic field detector, the microprocessor analyzing the set of data so as to identify characteristics of the product in the vicinity of the sensing head.

14. The foreign object detector of claim 13, wherein the feedback circuit further comprises a first analog signal multiplier, the first analog signal multiplier comprising:

(a) a first input signal, the phase of the first input signal being substantially identical to a signal emanating from the radio frequency oscillator; and (b) a second input signal, the second input signal emanating from the microprocessor, the second input signal modulating the first input signal and thereby creating a modulated output signal, the modulated output signal being fed back to the electromagnetic field detector so as to maintain electrical balance of the electromagnetic field detector at the phase of the first input signal.

15. The foreign object detector of claim 14, wherein the feedback circuit further comprises a second analog multiplier, the second analog multiplier comprising:

(a) a first input signal, the first input signal having a phase that lags the phase of the signal emanating from the radio frequency oscillator; and (b) a second input signal, the second input signal emanating from the microprocessor, the second input signal modulating the first input signal and thereby creating a modulated output signal, the modulated output signal being fed back to the electromagnetic field detector so as to maintain electrical balance of the electromagnetic field detector at the phase of the first input signal.

16. The foreign object detector of claim 15, wherein the first input signal to the second analog multiplier lags the phase of the signal emanating from the radio frequency oscillator by approximately ninety degrees.

17. The foreign object detector of claim 16, wherein the microprocessor alternately selects the output signals of the first and second analog multipliers to be fed back to the electromagnetic field detector in a manner calculated to maintain electrical balance of the electromagnetic field detector.

18. A method of detecting metal in a food product, comprising the steps of:

(a) generating a radio frequency field in the vicinity of the food product;

(b) detecting the radio frequency field in the vicinity of the food product;

(c) generating a corrective signal to maintain electrical balance of the radio frequency field in the vicinity of the food product;

(d) monitoring the characteristics of the corrective signal required to balance the radio frequency field in the vicinity of the food product, thereby producing a first set of data; and (e) analyzing the first set of data so as to detect the presence of metal in the food product when the signal characteristics required for maintaining the balance in the presence of the food product differ from the signal characteristics required to maintain the balance in the presence of food product not containing metal and from the signal characteristics required to maintain the balance when no food product is present.

19. The method of claim 18, further comprising the steps of:

(a) varying the phase of a reference signal required to maximize the amplitude of the radio frequency signal from the radio frequency field detector in the vicinity of the food product;

(b) monitoring variations in the balance signals required to minimize the signal from the radio frequency field detector, thereby producing a second set of data; and (c) analyzing the second set of data so as to detect the presence of metal in the food product when the balancing signal characteristics are different from that typically required to maintain the sensor balance in the presence of food product.

* * * * *